Dec. 25, 1945.　　A. MACKMANN ET AL　　2,391,580
LOAD HANDLING APPARATUS
Filed April 3, 1943　　2 Sheets-Sheet 1

Inventors:
Arthur Mackmann
and Wallace F. Ardussi,
By Dawson, Ooms and Booth,
Attorneys.

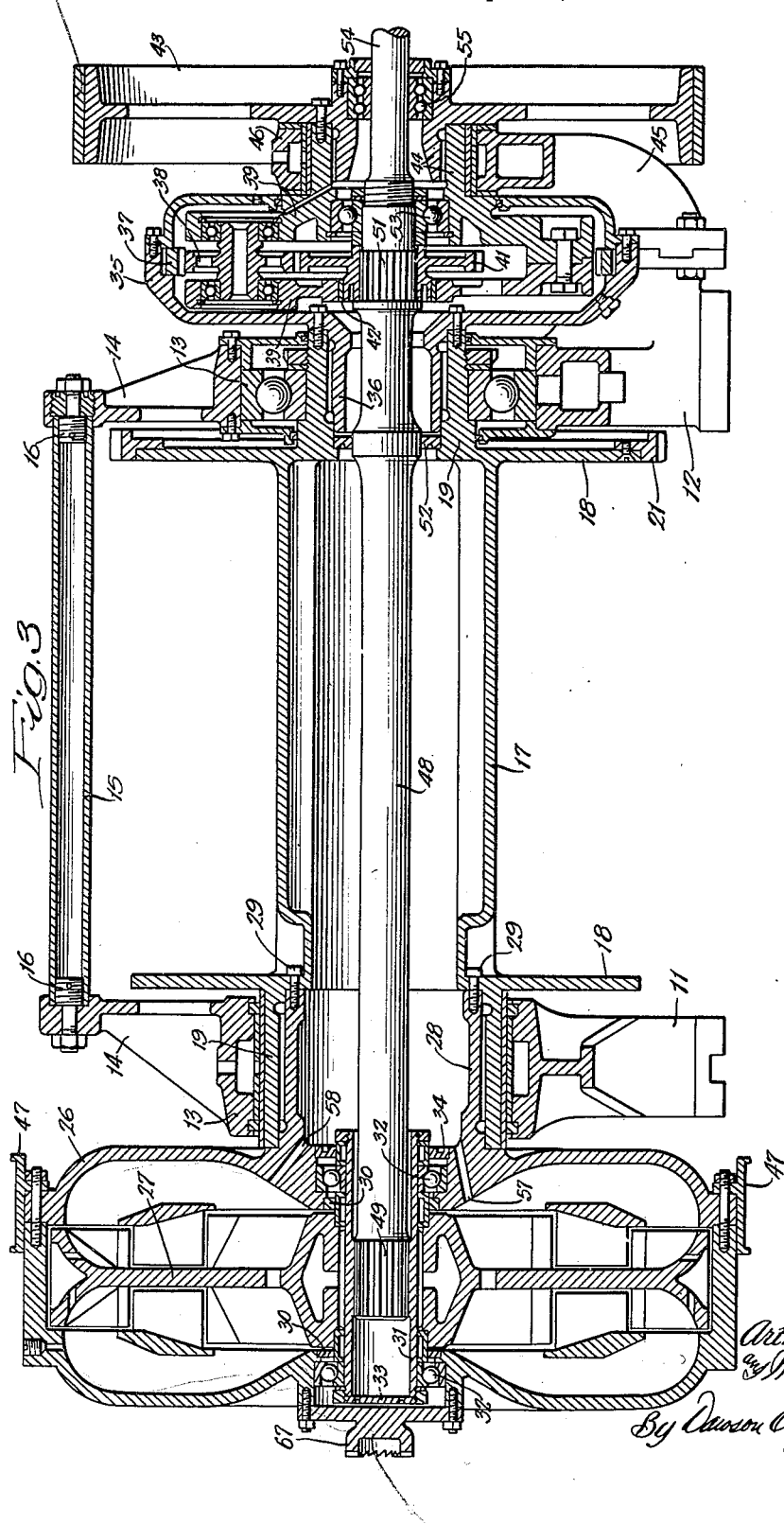

UNITED STATES PATENT OFFICE 2,391,580

LOAD HANDLING APPARATUS

Arthur Mackmann and Wallace F. Ardussi, Chicago, Ill., assignors to Foote Bros. Gear and Machine Corporation, Chicago, Ill., a corporation of Delaware Application April 3, 1943, Serial No. 481,736

10 Claims. (Cl. 254—186)

This invention relates to load handling apparatus and more particularly to apparatus for handling shock loads such as are encountered in picking up a stationary load with a moving vehicle.

One of the objects of the invention is to provide a load handling apparatus which has maximum load carrying capacity and strength with a minimum of weight and size.

Another object of the invention is to provide load handling apparatus in which the several moving parts are supported by spaced bearings on a frame located as closely as possible to the point of load application. With this construction, bending moments are held to a minimum and parts of minimum size and maximum load carrying capacity may be employed.

Another object of the invention is to provide load carrying apparatus including a reel rotatably mounted and which carries braking mechanism for absorbing a load. This construction eliminates the necessity for a large center shaft and makes the reel itself the principal load carrying unit.

Still another object of the invention is to provide load carrying apparatus made up of a plurality of unitary assemblies detachably connected together to form a complete apparatus.

Still another object of the invention is to provide load carrying apparatus including hydraulic load absorbing apparatus in which means are provided for circulation of the liquid from such apparatus and isolation thereof from the lubricating system of the apparatus. According to one feature of the invention, the drum of the reel forms a reservoir communicating with the hydraulic apparatus and providing storage and circulating space for the liquid.

The above and other objects and advantages of the invention will be more readily apparent from the following description when read in connection with the accompanying drawings, in which—

Figure 3 is a longitudinal section.

Figure 1:
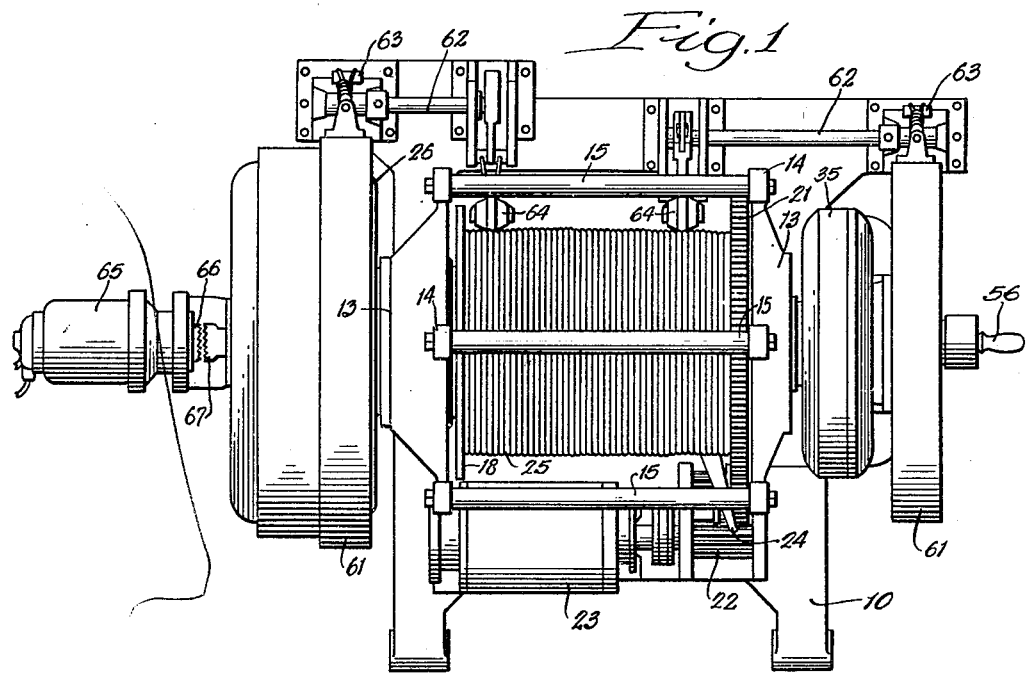
Figure 1 is a plan view of a unit embodying the invention.

The apparatus illustrated includes a frame made up of a base 10 on which a pair of spaced uprights 11 and 12 are mounted. Preferably, the uprights are formed with slots at their lower ends to fit over projections on the base rigidly to secure the uprights thereto in predetermined position. Each of the uprights is formed with a central bearing 13 and each has a plurality of arms 14 projecting therefrom and connected by cross rods 15. As shown in Figure 3, the cross rods are pipes or tubes having threaded plugs 16 adjacent their ends carrying bolts by which the cross rods are detachably connected to the arms 14.

A reel is rotatably mounted between the uprights and is formed with a hollow drum 17 and end flanges 18. The reel is of such a length that the end flanges lie closely adjacent the uprights and is rotatably supported on the uprights by annular hubs 19 on its opposite ends rotatably supported in the bearings 13.

The reel may be driven for winding cable thereon by means of an annular gear 21 bolted or otherwise rigidly secured to one of the flanges 18 and meshing with the final gear of a gear train 22 driven by a motor 23. The gear train includes a clutch having a control lever 24 so that when the clutch is engaged the reel will be driven in a direction to wind cable 25 thereon.

Unwinding of cable from the reel is controlled by a braking mechanism including a hydraulic coupling which may be of the type more particularly described and claimed in the patent to Carson and Anderson, No. 2,150,539 issued March 14, 1939, having an outer casing 26 and a vaned rotor 27 in the casing. The casing 26 has an annular projecting hub 28 at one side which is slidably keyed or splined in one of the hubs 19 and is secured thereto by bolts 29. The rotor member 27 is rotatably supported in the casing 26 on a sleeve 31 rotatably mounted on bearings 32 in the casing and closed at one end by a plug 33. The coupling is sealed against the sleeve 31 by a pair of seals 30 which separate the coupling interior from the bearings 32 and a liquid seal 34 is mounted around the open end of the tube 31 to seal the space between the tube and casing against fluid flow into the bearing assembly.

At the opposite end of the reel there is mounted a reverse gear unit formed by an outer casing 35 having an annular hub 36 at one end which is slidably keyed or splined into the opposite hub 19 of the reel. The casing 35 carries an internal gear 37 meshing with a series of planet pinions 38 rotatably supported on a gear carrier 39. The pinions 38 in turn mesh with a sun gear 41 which is rotatably supported in the carrier 39 by a main bearing 53 and a secondary bearing 42.

The gear carrier 39 is adapted to be held against rotation to make the reverse gear effective and for this purpose is connected to a brake drum 43 through splined or keyed hubs 44 on the carrier and drum respectively. In order to support the load of the brake drum, the uprights 12 is preferably formed with an extension 45 carrying a bearing 46 surrounding the hubs 44 and lying between the gear unit and the brake drum. With this construction, application of load on the brake is absorbed directly by the bearing 46 and does not create an extreme bending load on the gear unit. A similar brake drum 47 is secured to the coupling casing 26 and lies closely adjacent the bearing 13 in upright 11 so that its load is absorbed by this bearing without creating a large bending moment.

The coupling and gear unit are connected by a shaft 48 extending loosely through the drum of the reel and splined at 49 to the sleeve 31 and at 51 to the sun gear 41. A seal 52 is provided around the shaft 48 adjacent the gear unit to separate the interior of the reel drum and of the gear casing. The shaft 48 is supported entirely by the sleeve 31 and the sun gear and bearing 53 so that it is subjected to no bending load but serves solely to transmit torque between the vaned rotor 27 of the coupling and the sun gear of the gear unit. Thus, the shaft may be made of relatively small size to minimize the weight of the unit. The shaft 48 may, if desired, have an extension 54 extending out through the brake drum 43 and journalled thereon in a bearing 55 to carry a hand crank 56. By operation of this crank torque may be transmitted to the reel through the hydraulic unit to wind cable thereon when desired.

It will be noted that with this construction the several parts are assembled in units which are then connected together to form a complete operative assembly. In making up such an assembly, the reel is first mounted in the uprights 11 and 12 which are connected to the base 10. The left half of the gear housing 35 is then connected to the reel hub 19 through its hub 36 and is bolted in place as shown. The gear unit may then be assembled with the shaft 48 therein and may be assembled into the left half of the gear housing as shown. Thereafter, the extension 45 may be secured to the upright 12 and the brake drum 43 fastened in place. The hydraulic coupling which has been previously assembled may then be placed on the opposite end of the reel with the splines 49 sliding into the sleeve 31 and with the hubs 19 and 28 keying together. In the event it is necessary to remove any of these units for repair or replacement, this can easily be done without requiring complete disassembly.

The hydraulic coupling casing 26 is adapted to contain varying amounts of fluid depending upon operating conditions and is preferably supplied with a relatively large volume of fluid to provide maximum heat absorbing capacity and brake resistance capacity. In the construction shown in Figure 3, the interior of the reel drum 17 serves as a liquid reservoir and communicates with the casing 26 through passages 57 and 58 in the casing. As shown, the passages 57 are located closely adjacent the axis of the unit at a relatively small angle thereto while the passages 58 are at a greater angle. In operation with the unit at rest, the liquid will seek a level in the casing 26 and the drum 17. As the casing is rotated, centrifugal force will cause fluid to flow from the hub through the passages into the casing to fill it more completely. During this operation, the passages 58 will be more effective than the passages 57 due to their greater radial length so that by properly designing and proportioning the passages, any desired effect can be obtained. It will be noted that the drum is separated from the several bearings by the seals 30, 34 and 52 so that the liquid supply system for the coupling is isolated from the bearings and gears. With this construction a non-lubricating liquid such as water may be used in the coupling without interfering with lubrication of the bearings and gears so that a higher heat absorbing capacity may be provided than could be obtained if oil were used in the coupling.

Figure 2:
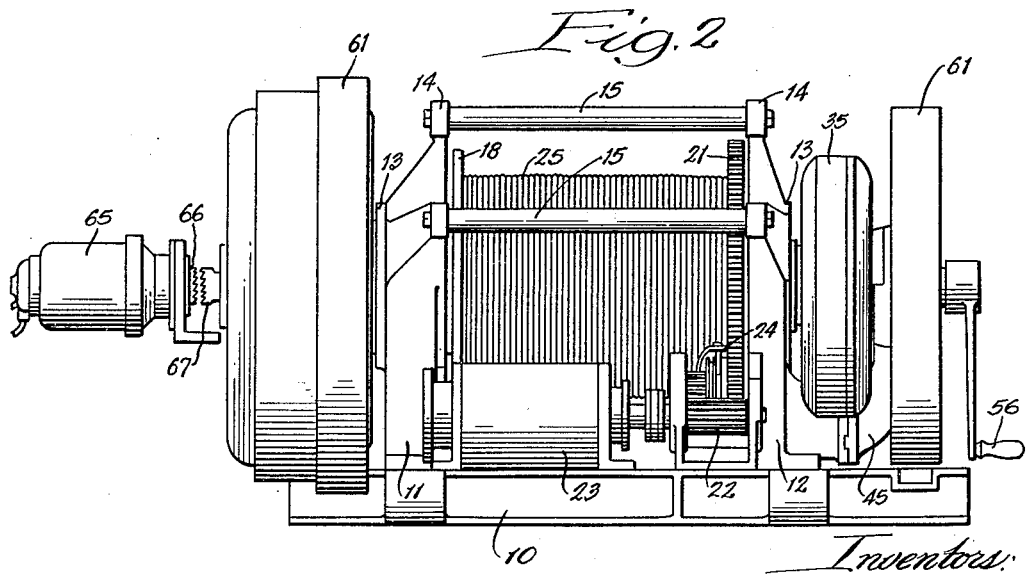
Figure 2 is a side elevation.

The brake drums 43 and 47 may be engaged by brake bands 61 as shown in Figures 1 and 2 which are controlled through shafts 62 and linkage 63. This linkage may be of the type more particularly described and claimed in the patent to Carson et al. No. 2,116,013 to provide a variable braking effect. The linkage as shown is controlled by follower rollers 64 riding against the cable 25 on the drum to cause a variable braking force in accordance with the diameter of the cable as more particularly described and claimed in the copending application of Ardussi, Anderson and Landry, Serial No. 483,078, filed April 14, 1943.

In order to accelerate the reel to unwind cable therefrom so that a load may be picked up without shock, a motor 65 is provided having a clutch 66 to engage a complementary clutch 67 which is secured to the outer end of the coupling housing 26. This motor may be controlled as more particularly described and claimed in the application of Ardussi, Anderson and Landry referred to above.

While one embodiment of the invention has been shown and described in detail, it will be understood that this is illustrative only and is not intended as a definition of the scope of the invention, reference being had for this purpose to the appended claims.

What is claimed is:

1. Load handling apparatus comprising a frame including a pair of spaced uprights, bearings carried by the uprights, a reel between the uprights rotatably supported on the bearings, a hydraulic coupling having one member connected to and supported by the reel adjacent and outside of one of the uprights, a differential gear unit having one element connected to and supported by the reel outside of the other upright, the drum of the reel being hollow, and a shaft extending through the drum of the reel connecting another member of the coupling to another element of the gear set.

2. Load handling apparatus comprising a frame including a pair of spaced uprights, bearings carried by the uprights, a reel between the uprights rotatably supported on the bearings, a hydraulic coupling having one member connected to and supported by the reel adjacent and outside of one of the uprights, a differential gear unit having one element connected to and supported by the reel outside of the other upright, said other upright being forked to provide a bearing support on the outside of the gear unit, a brake drum rotatably supported in the last named bearing support and connected to another element of the gear unit, the drum of the reel being hollow, and a shaft extending through the drum of the reel connecting another member of the coupling to a third element of the gear unit.

3. Load handling apparatus comprising a frame including a pair of spaced uprights, bearings carried by the uprights, a reel between the uprights rotatably supported on the bearings, a hydraulic coupling having a casing secured to one end of the reel and supported thereby outside of one of the uprights, and a rotor member rotatable in the casing, a gear casing secured to the other end of the reel and supported thereby outside of the other upright, an internal gear secured to the gear casing, a planet carrier in the gear casing, planet pinions on the carrier meshing with the internal gear, a sun gear in the casing meshing with the pinions, the drum of the reel being hollow, and a shaft extending through the drum and connecting the sun gear to the rotor member.

4. Load handling apparatus comprising a frame including a pair of spaced uprights, bearings carried by the uprights, a reel between the uprights rotatably supported on the bearings, a hydraulic coupling having a casing secured to one end of the reel and supported thereby outside of one of the uprights, and a rotor member rotatable in the casing, a gear casing secured to the other end of the reel and supported thereby outside of the other upright, an internal gear secured to the gear casing, a planet carrier in the gear casing, planet pinions on the carrier meshing with the internal gear, a sun gear in the casing meshing with the pinions, the drum of the reel being hollow, and a shaft extending through the drum and slidably keyed to the sun gear and the rotor member whereby the coupling and gear casing can be removed as units from the reel and shaft.

5. Load handling apparatus comprising a frame having a pair of spaced uprights, bearings carried by the uprights, a reel between the uprights having a hollow drum portion and annular hubs at its ends rotatably supported by the bearings, a hydraulic coupling having an internal rotor member and a casing formed at one end with an annular hub slidably keyed into one of the hubs on the reel so that the casing is connected to and supported by the reel, a shaft connected to the rotor member and extending through the reel drum, and means connected to the shaft to produce a relative rotation between the rotor member and casing when the reel is turning.

6. Load handling apparatus comprising a frame having a pair of spaced uprights, bearings carried by the uprights, a reel between the uprights having a hollow drum portion and annular hubs at its ends rotatably supported by the bearings, a hydraulic coupling having an internal rotor member and a casing formed at one end with an annular hub slidably keyed into one of the hubs on the reel so that the casing is connected to and supported by the reel, a shaft connected to the rotor member and extending through the reel drum, a gear casing having an annular hub slidably keyed to the other hub on the reel, and reverse gearing in the casing having one element connected to the casing and another element connected to the shaft.

7. Load handling apparatus comprising a frame having a pair of spaced uprights, bearings carried by the uprights, a reel between the uprights having a hollow drum portion and annular hubs at its ends rotatably supported by the bearings, a hydraulic coupling having an internal rotor member and a casing formed at one end with annular hub slidably keyed into one of the hubs on the reel so that the casing is connected to and supported by the reel, the rotor member being rotatably supported by the casing, a gear casing having an annular hub slidably keyed into the other hub on the reel, an internal gear carried by the gear casing, a planet carrier rotatably mounted in the gear casing, planet pinions on the carrier meshing with the internal gear, a sun gear rotatably supported by the planet carrier and meshing with the planet pinions, means to hold the planet carrier against rotation, and a shaft connected to and supported by the rotor member and sun gear and extending loosely through the reel.

8. Load handling apparatus comprising a frame having a pair of spaced uprights, bearings carried by the uprights, a reel between the uprights having a hollow drum portion and annular hubs at its ends rotatably supported by the bearings, a coupling casing having vanes on its interior and an annular hub at one end slidably keyed into one of the hubs on the reel, a tube axially and rotatably supported in the casing, a vaned rotor member carried by the tube and fitting in the coupling casing, a gear casing having an annular hub slidably keyed into the other hub on the reel, an annular gear carried by the gear casing, planet gears in the gear casing meshing with the annular gear, a sun gear in the gear casing meshing with the planet gears, and a shaft slidably keyed at one end in said tube and at its other end to the sun gear and extending loosely through the reel.

9. Load handling apparatus comprising a frame having a pair of spaced uprights, bearings carried by the uprights, a reel between the uprights having a hollow drum portion and annular hubs at its ends rotatably supported by the bearings, a coupling casing having vanes on its interior and an annular hub at one end slidably keyed into one of the hubs on the reel, a tube axially and rotatably supported in the casing, a vaned rotor member carried by the tube and fitting in the coupling casing, a gear casing having an annular hub slidably keyed into the other hub on the reel, an annular gear carried by the gear casing, planet gears in the gear casing meshing with the annular gear, a sun gear in the gear casing meshing with the planet gears, a shaft slidably keyed at one end in said tube and at its other end to the sun gear and extending loosely through the reel between the tube and the gear casing, and sealing means between the shaft and the reel drum spaced from the tube to form a closed space within the drum between the sealing means and the tube, the coupling casing having an opening therein communicating with said space.

10. Load handling apparatus comprising a reel, a hydraulic coupling having a casing, means connecting the casing to the reel to support the casing, a tube rotatably mounted in the casing, a rotor member mounted on the tube, means sealing the end portions of the tube against the casing to prevent leakage of liquid therebetween, and means to connect the rotor member to the reel including a shaft slidably keyed in the tube and extending loosely axially through the reel, the tube supporting the adjacent end of the shaft.

ARTHUR MACKMANN.
WALLACE F. ARDUSSI.